March 19, 1968  C. J. HAAS  3,374,308
CONDUIT INSULATING SPACER
Filed Sept. 12, 1966  2 Sheets-Sheet 1
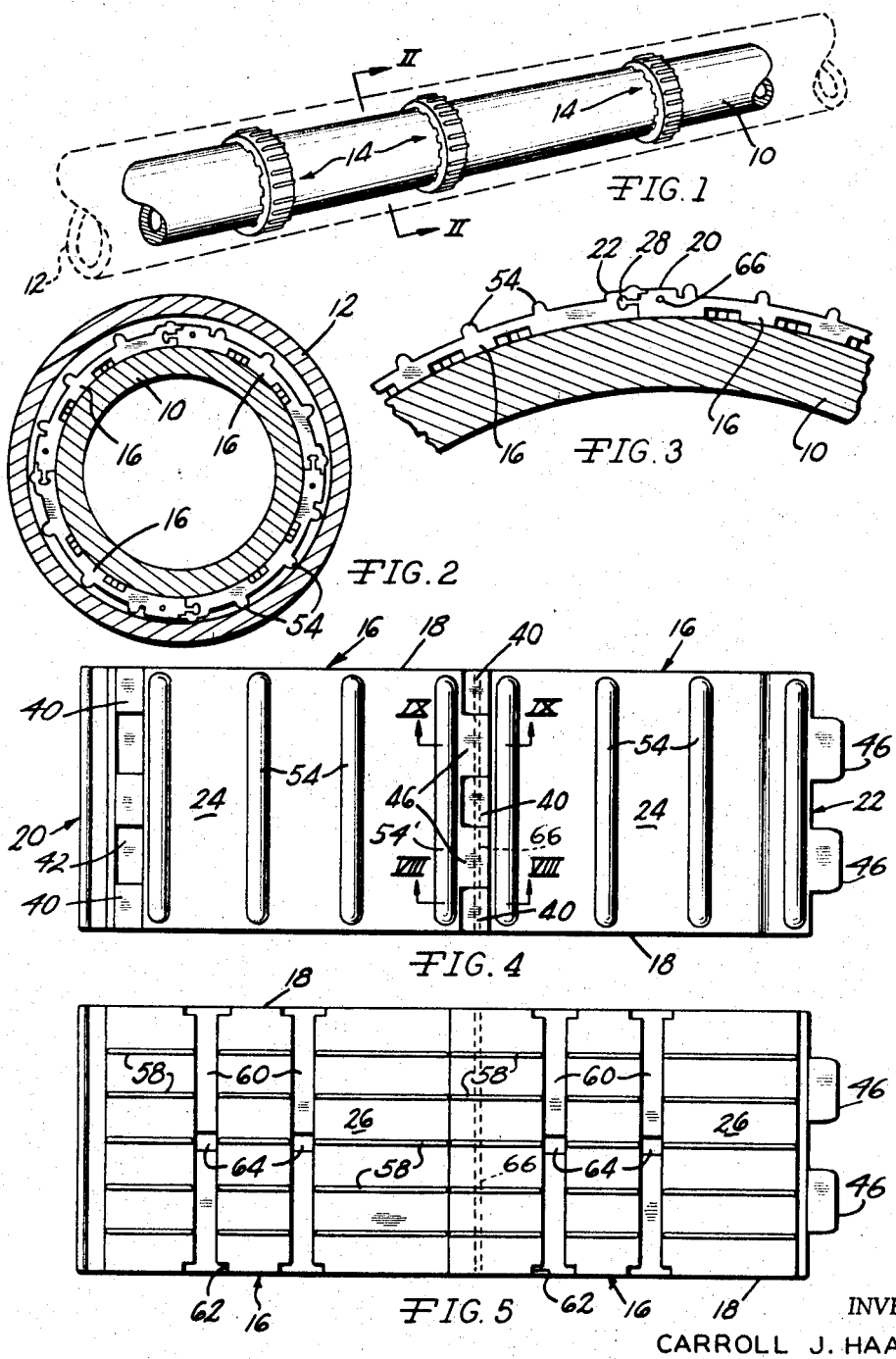
INVENTOR
CARROLL J. HAAS
BY Beaman & Beaman
ATTORNEYS March 19, 1968 C. J. HAAS 3,374,308
CONDUIT INSULATING SPACER
Filed Sept. 12, 1966 2 Sheets-Sheet 2
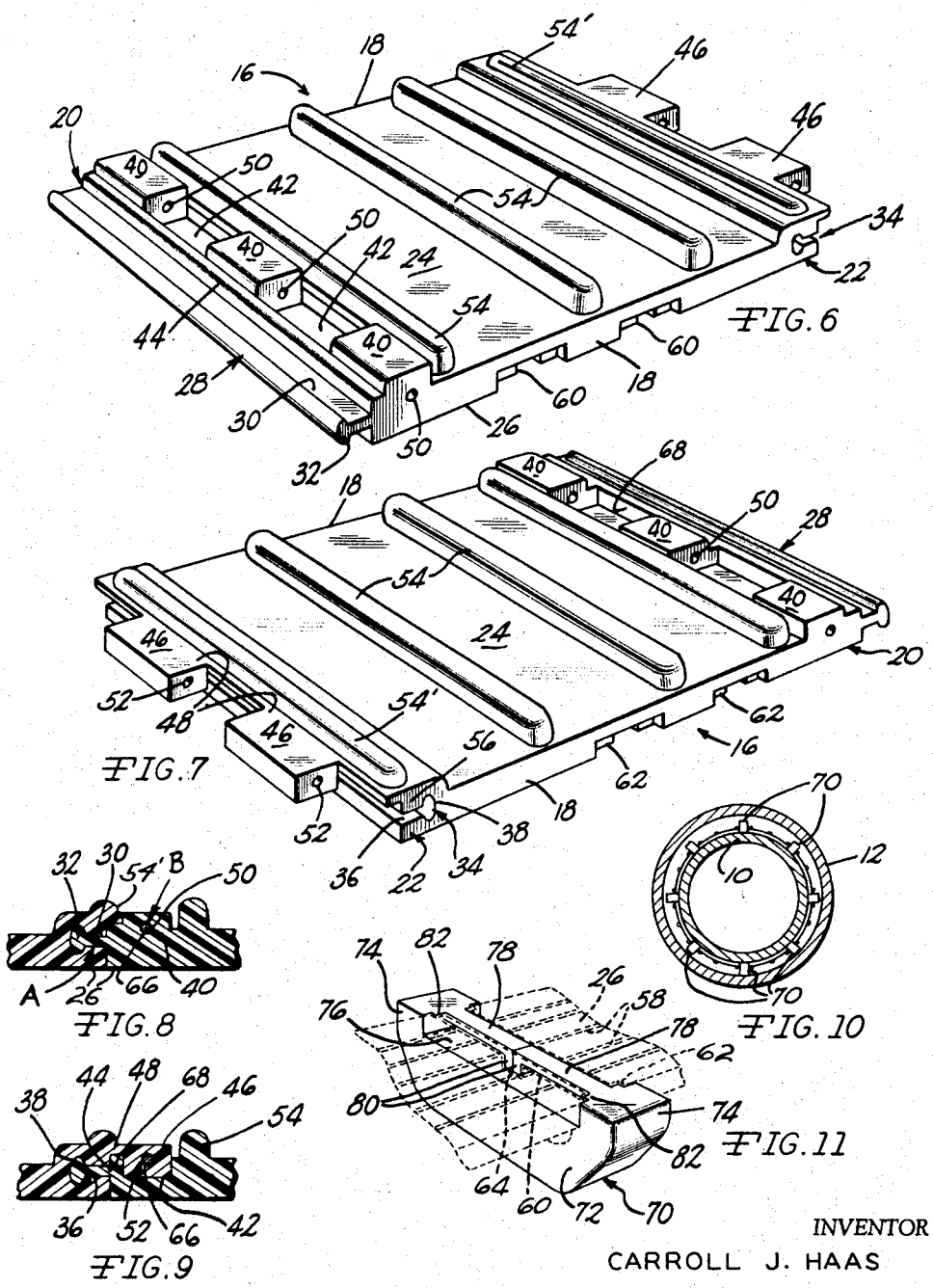
INVENTOR
CARROLL J. HAAS
BY Beaman & Beaman
ATTORNEYS United States Patent Office 3,374,308
Patented Mar. 19, 1968

3,374,308
CONDUIT INSULATING SPACER
Carroll J. Haas, Mendon, Mich., assignor to Research Molding, Inc., Mendon, Mich., a corporation of Michigan
Filed Sept. 12, 1966, Ser. No. 578,703
12 Claims. (Cl. 174—138)

ABSTRACT OF THE DISCLOSURE

An electrically insulating spacer for conduits mounted within housings consisting of a plurality of dielectric segments interconnected to form an annular collar about the conduit, spacing projections being defined upon the segments from the material of the segments.

In the public utility art it is common to insert a natural gas, oil, or water conduit within a larger conduit or tubular housing. For instance, when a buried gas or water main corrodes, or otherwise becomes unserviceable, it is common practice to insert a new conduit of smaller diameter into the existing conduit. Also, wherein it is desired to provide optimum protection of a buried conduit, a smaller conduit may be placed within a larger conduit wherein the larger conduit serves as a protective housing. In such instances, where one conduit is housed within another, it is desirable to electrically insulate the inner conduit from the outer conduit or housing. The invention pertains to an insulator which is particularly suitable for this purpose.

It is, therefore, an object of the invention to provide an insulator capable of electrically insulating an inner conduit from an encompassing conduit or housing.

Another object of the invention is to provide an electrical insulator for insulating a conduit encased within another conduit or housing wherein the insulator has superior abrasive resistance characteristics and is able to effectively support and protect the inner conduit as the inner conduit is being axially inserted into the outer conduit, and is also able to resist the considerable abrasion and wear to which it is subjected during assembly of the inner and outer conduits.

An additional object of the invention is to provide an insulator of the described type which consists of a plurality of similar segments. The segments are such that they may be assembled to accommodate a wide variety of conduit sizes and can be assembled to form a collar tightly encompassing the inner conduit which will not be axially shifted or displaced thereon.

A further object of the invention is to provide an insulator of the described type consisting of a plurality of similar segments adapted to be interconnected to form an annular collar circumscribing the inner conduit to be insulated, wherein the segments are resilient and capable of circumferential elongation.

Another object of the invention is to provide an insulator consisting of a plurality of similar, interconnected segments having ends wherein the end of one segment is shaped to mate with the end of an adjacent segment, and the segment ends are provided with locking means capable of transmitting and resisting high tension forces present in the assembled insulating collar.

A further object of the invention is to provide an insulator of the described type consisting of a plurality of similar, interconnected segments wherein the segments are of an inexpensive, molded construction.

Yet another object of the invention is to provide an insulator of the described type which is capable of establishing an effective frictional contact with the conduit circumscribed, and wherein the means interconnecting the segments is so constructed as to insure intimate engagement of the segments with the inner conduit.

A further object of the invention is to provide an insulator of the described type, wherein auxiliary spacers may be associated with the insulator to permit a single insulator segment configuration and size to be employed with a wide variety of dimensional variations between the inner and outer conduits wherein the spacer is firmly affixed to the insulator and is capable of resisting the abrasive forces which may be imposed thereon.

These and other objects of the invention which will be apparent from the details and relationships of an embodiment thereof are described in the following specification and accompanying drawings wherein:

FIG. 1 is a perspective view of the environment in which the invention is used, the outer conduit or housing being shown in dotted lines, FIG. 2 is an elevational, cross-sectional view as taken along section II—II of FIG. 1, the outer conduit being illustrated, FIG. 3 is an enlarged, detail, elevational, sectional view of assembled insulator segments and the associated inner conduit, FIG. 4 is a plan view of the outer faces of a pair of interconnected insulator segments in accord with the invention, FIG. 5 is a view of the inner faces of the interconnected segments of FIG. 4, FIG. 6 is a perspective view of an insulator segment, the tongue end and outer face being disposed toward the viewer, FIG. 7 is a perspective view of an insulator segment in accord with the invention, the groove end and outer face being disposed toward the viewer, FIG. 8 is an enlarged, elevational, sectional, detail view taken along section VIII—VIII of FIG. 4, FIG. 9 is an enlarged, detail, elevational, sectional view taken along section IX—IX of FIG. 4, FIG. 10 is an elevational, sectional view similar to that of FIG. 2, illustrating auxiliary spacers being employed with the insulator, and FIG. 11 is a perspective view of an auxiliary spacer assembled to the associated insulator segment, the segment being shown in dotted lines and the segment inner face being disposed in the upward direction as viewed.

The environment in which the invention will most commonly be used is shown in FIG. 1. In FIGS. 1 and 2 an inner pipe or conduit 10 is disposed within an outer conduit or housing 12. The outer conduit 12 may be an unserviceable gas or water main, and the inner conduit 10 may be a new main which is inserted into the conduit 12 by axially sliding the conduit 10 within the outer conduit.

To prevent metal-to-metal contact between the conduits 10 and 12, dielectric insulators 14 are axially positioned at spaced locations on the inner conduit 10. The invention pertains to the insulators 14.

In accord with the invention, the insulators 14, which are in the assembled form of an annular collar circumscribing the inner conduit 10 and in firm frictional engagement therewith, are formed from a plurality of interconnected segments 16. The configuration of the segments 16 is best appreciated from Figs. 4 through 9.

The segments 16 are similar in configuration and are of a generally rectangular form. In one embodiment of the invention, the segments are of a width between the longitudinal edges 18 of approximately three inches and are made in three and four inch lengths as measured between the ends 20 and 22. The segments 16 are molded of a dielectric material which has good wear abrasion characteristics, high tensile strength, high elongation factor, and relatively inert characteristics with respect to corrosion.

One material which has been found to be suitable is polyurethane resin processed to have a tensile strength of approximately 5,000 p.s.i. and an elongation factor of approximately 400%.

The end 20 constitutes the tongue end of the segments 16 and the end 22 constitutes the grooved segment end. The surface 24 constitutes an outer face of the segment and the surface 26 forms the inner face which is disposed toward the inner conduit when assembled thereto.

To permit a firm interconnection to be provided between adjacent segments, a tongue 28 is defined upon the end 20 extending the width of the segments and integral therewith. The tongue includes a portion 30 of a substantially uniform thickness and terminates in a bulbous end 32. At the end 22 of the segments, a groove 34 is formed consisting of a portion 36 adapted to closely receive a tongue portion 30, and an enlarged recess 38 adapted to receive the tongue end 32. The groove 34 also extends the width of the segment between the edges 18.

The segment end 20 is provided with three upstanding lugs 40 which constitute intermeshing portions for cooperation with components formed upon the segment ends 22. The lugs 40 are molded from the material of the segment and define substantially rectangular recesses 42. It will be noted that the recesses 42 are separated from the segment end 20 by a ridge 44 perpendicularly disposed relative to the general plane of the segments, Fig. 9.

The segment ends 22 are provided with a pair of rectangular lugs 46 extending therefrom. The lugs 46 are of such dimension as to be closely received within recesses 42 of the adjacent segment. The lugs 46 are affixed to the segment ends 22 at a relatively thin cross-sectional portion 48.

It will be noted that the segment end 20 is provided with an increased amount of material, due to the lugs 40, which strengthens the end of the segment. Likewise, the segment end 22 is provided with an increased cross-sectional thickness adjacent the groove to reinforce the segment. Bores 50 are defined in the lugs 40. The bores 50 are in alignment with each other and are substantially parallel to the tongue 28. Bores 52 are defined in the lugs 46 and are in alignment with each other and parallel to the groove 34.

The segment outer face 24 is provided with three upstanding, wear-resisting ridges or projections 54. The projections 54 extend substantially the width of the segments and a projection 54' is defined upon the segment portion 56 adjacent the end 22 to protect the segments at the interconnected ends. When the segment 16 is laid on a planar surface, the uppermost portions of the projections 54 and 54' lie in a common plane.

The inner face 26 of the segments is provided with a plurality of projections or treads 58 which extend the length of the segments and project about 1/64 of an inch from the inner face, Figs. 4 and 5. A pair of recesses 60 are defined on the inner face of the segments extending between the edges 18. The recesses 60 include enlarged end portions 62 adjacent the edges 18, and the central portion of the recess is provided with a deeper identation 64 of a rectangular configuration for cooperation with the ends of the arms of auxiliary spacers, as will be later described.

In operation, the invention is assembled as follows:

The segments 16 are interconnected by interconnecting the end 20 of one segment to the end 22 of another. The relationship of the interconnected segments will be appreciated from the drawings wherein the tongue 28 is closely received within the groove 34 of the adjacent segment, and the lugs 46 are closely received within the recesses 42. Upon the lugs 46 being fully received within the recesses 42, the bores 52 will align with the bores 50 and permit a wire pin 66 to be inserted into the formed, elongated bore having a length equal to the distance separating the edges 18. The pin 66, thus, interconnects the segments to prevent their disassembly.

Assembly of the segments may be accomplished by using a special tool which opens the groove 34 to permit the tongue to be directly inserted therein, or the lugs 46 may be pivoted upwardly, Fig. 9, about the portion 48 and the tongue 28 axially slid into the groove.

The pin 66 is, preferably, of a heat-treated material having high resistance to bending and shear forces to prevent deformation when the assembled segments are placed under tension.

A sufficient number of segments 16 are assembled to define a chain having a length slightly less than the circumference of the inner conduit 10. The segments are disposed about the conduit 10 and sufficient tension is then placed on the chain of segments to stretch the resultant collar in a circumferential direction to permit the remaining end 20 to be interconnected with the end 22. The final pin 66 is inserted upon the tongue being placed within the groove, and the assembly of the insulator is completed. Of course, the primary stretching of the segments 16, when assembling the annular collar to the inner conduit 10, occurs in that portion of the segments of minimum thickness, namely, in the region between the recesses 60 and the outer face 24.

It is desirable that the material of which the segments are formed has sufficient resistance to stretching that a firm, tight, frictional engagement of the collar of segments to the inner conduit exists. The treads 58 defined on the inner face of the segments increases the frictional engagement between the segments and the inner conduit. It is common to coat the inner conduits with tar, asphalt, or other protective coating, and the treads are capable of embedding in this coating and firmly gripping the inner conduit.

The insulators 14 are normally placed on the inner inner conduit 10 every six or eight feet therealong. When the inner conduit is axially inserted into the outer conduit 12, the ends of the projections 54 located at the lowermost regions of the inner conduit, FIG. 2, will engage the inner surface of the outer conduit 12 and support the weight of the inner conduit. It will be appreciated that due to the weight of the inner conduit, considerable abrasion is imposed upon those projections 54 engaging the inner surface of the outer conduit. The ends of the projections 54 are rounded to prevent the collar from snagging on welds or other protrusions existing on the inner surface of the outer conduit, and the projections are of such radial dimension as to provide adequate insulating space between the inner conduit and outer conduit, even though the projections may wear to some extent during installation of the inner conduit.

A feature of the invention which prevents buckling or partial disengagement of the segment ends when the segments are placed under tension is due to the relationship of the bores 50 and 52 with respect to the tongue 28 and groove 34. As will be noted in FIGS. 8 and 9, the bores 50 and 52 are a greater distance from the segments' inner faces 26 than the tongue 28 and the groove 34. Thus, when the assembled segments are stretched about the circumference of the inner conduit, compression forces exist in the region generally indicated at A, FIG. 8, while the tension forces imposed upon the segment interconnection exist in a region of B, FIG. 8, at the pin, due to the tendency for a hinging action to occur at the pin. As the lug surfaces 68 and the ridge 44 are disposed at right angles to the tension forces within the segments, effective resistance to the tension forces is provided. Additionally, as the pin 66 maintains the lugs 46 within the recesses 42 and resists the shear forces attempting to disengage the intermeshing relationship between the lugs 40 and the lugs 46, a firm interconnection between adjacent segments is provided which is capable of withstanding high tension forces.

An advantage of an insulator constructed in accord with the above lies in the fact that with just two lengths of segments it is possible to form an insulator collar for a large number of inner conduit diameters. The percentage of degree of stretching of the segments is sufficient to permit a collar to be formed of any length above a minimum length. For instance, it would be difficult to form a collar with less than three segments.

In order to add even greater versatility to an insulator constructed in accord with the invention, auxiliary spacers may be used therewith wherein a considerable difference exists between the diameter of the outer conduit 12 and the inner conduit 10, as in FIG. 10. When such a difference exists between the diameters of the inner and outer conduits, it is desirable to more accurately locate the inner conduit within the outer conduit than would be possible with the usual segments 16.

The auxiliary spacers 70 are of an elongated configuration formed of a dielectric material, such as high density polyethylene or other readily moldable composition, and include a body 72 of a length greater than the width separating the edges 18 of the segments 16. The spacer body 72 is of such thickness as to provide the desired radial dimension of the insulator. The portions 74 of the spacer body extend over the segment edges 18 wherein the spacer surface 76 may directly engage the outer face 24 of the segments intermediate the projections 54.

Arms 78 extend from the projection portion 74 toward each other and are of such dimension as to be received within the recesses 60 defined in the inner face of the segments. The arms 78 terminate in flanges 80 adapted to be received within the segment indentations 64. The indentations 64 of the flanges 80 may be provided with undercut portions as to retain the flanges in the indentations, as shown in FIG. 11. Also, the portions 74 are formed with rectangularly shaped bosses 82 adapted to closely cooperate with the enlarged recess end portions 62 defined in the inner face of the segments adjacent the edges 18.

In the above described manner, as shown in FIG. 11, the spacers 70 may be affixed to the segments 16 to increase the radial effective dimension of the segments with respect to the spacing produced between the inner and outer conduits. The interconnection of the spacers on the segments firmly locates and affixes the spacers to the segments and prevents accidental displacement as the inner conduit is being inserted into the outer conduit. In the aforedescribed manner, the spacers increase the versatility of the insulator which may be assembled from the segments 16.

It is appreciated that various modifications to the invention may be apparent to those skilled in the art without departing from the spirit and scope thereof, and it is intended that the invention be defined only by the following claims.

I claim:
1. An insulator for insulating conduits from a supporting tubular housing comprising, in combination, a plurality of interconnected segments formed of a flexible, elastic, dielectric material, said segments each having first and second ends and in inner face and an outer face, spacing projections defined on said segments from the material thereof and extending from said outer face, and interconnecting means defined on said first and second ends of said segments, the first end of each segment being connected to the second end of an adjacent segment to interconnect said segments to define a collar for circumscribing a conduit.

2. In an insulator as in claim 1 wherein said projections extend in an outward, radial direction with respect to the annular configuration of the resulting collar defined by said plurality of interconnected segments.

3. In an insulator as in claim 1, wherein said interconnecting means include intermeshing elements intermeshing in the circumferential direction of the collar defined by interconnected segments, a bore defined in each of said intermeshing elements transversely disposed to the direction of intermeshing of said elements, said bores of intermeshed elements aligning to define an elongated bore and a retaining pin received within and extending through said elongated bore.

4. In an insulator as in claim 3, wherein said interconnecting means includes a tongue defined on the first end of each segment and a groove defined in the second end of each segment, said grooves receiving the tongue of the adjacent segment.

5. In an insulator as in claim 4, wherein said tongues and grooves are of an elongated configuration and are substantially parallel to said bores defined in said intermeshing elements.

6. In an insulator as in claim 4, wherein said bores defined in said intermeshing elements are a greater distance from the inner face of the associated segment than the associated tongue and groove.

7. In an insulator as in chain 1 wherein said segments are formed of a polyurethane resin.

8. In an insulator as in claim 1, a plurality of spacers mounted upon said segments radially extending from the annular collar defined by said interconnected segments, said spacers extending from the outer faces of the associated segments, and means mounting said spacers upon the associated segment.

9. In an insulator as in claim 8, at least one groove defined upon the inner face of said segments, said groove extending substantially parallel to said segment ends, said means mounting said spacers comprising at least one arm defined on each spacer received within a groove defined upon the inner face of the associated segment.

10. In an insulator as in claim 1, wherein friction increasing tread means are defined upon said inner face of said segments.

11. An article of manufacture constituting a spacing insulator segment comprising a segment body of flexible, elastic, dielectric material of a generally rectangular sheet configuration having a longitudinal length defined by first and second ends and having outer and inner face surfaces, projections defined on said body from the material thereof and extending from said outer face surface, lugs defined on said segment body adjacent to and extending beyond said first end, lug receiving recesses defined adjacent said body second end and retainer pin receiving holes defined in said lugs and said second end adjacent said recesses whereby lugs received within said recesses may be retained therein by a retainer pin.

12. An article of manufacture as in claim 11 wherein a transversely extending tongue is defined on one of said body ends and a transversely extending tongue receiving groove is defined on the other end of said body.

References Cited

UNITED STATES PATENTS 3,088,237   5/1963   Plummer.
3,161,210   12/1964  Loof.

FOREIGN PATENTS 376,328   5/1964   Switzerland.

LARAMIE E. ASKIN, *Primary Examiner.*